United States Patent

[11] 3,578,048

[72] Inventor Harrison M. Von Duyke
P.O. Box 842, Wilmington, Del. 19899
[21] Appl. No. 830,000
[22] Filed June 3, 1969
[45] Patented May 11, 1971

[54] POTATO DICER
8 Claims, 8 Drawing Figs.
[52] U.S. Cl. ................................................. 146/78, 146/160
[51] Int. Cl. .................................................. B26d 1/06, B26d 3/20
[50] Field of Search ........................................ 146/78, 160, 149, 150; 83/623; 146/78 (A)

[56] References Cited
UNITED STATES PATENTS
| | | | |
|---|---|---|---|
| 2,157,604 | 5/1939 | Gray | 146/78 |
| 2,219,963 | 10/1940 | Rieder | 146/160 |
| 3,333,616 | 8/1967 | Walker | 146/160 |
| 3,349,824 | 10/1967 | Trenor | 146/160X |

Primary Examiner—Willie G. Abercrombie
Attorney—Zachary T. Wobensmith, II

ABSTRACT: Apparatus for dicing cooked potatoes which includes a base, support members for supporting the potatoes, tracks on the base carrying a pair of opposed cutting frames, which frames have metallic cutting wires thereon, and a drive connecting the frames to provide horizontal motion to the frames to cut the potatoes into strips so that they can be further diced by a vertically movable blade.

PATENTED MAY 11 1971

INVENTOR.
HARRISON M. von DUYKE
BY
B.T. Wobensmith
ATTORNEY.

INVENTOR.
HARRISON M. von DUYKE
BY B.T.Wolbensmith 2nd
ATTORNEY.

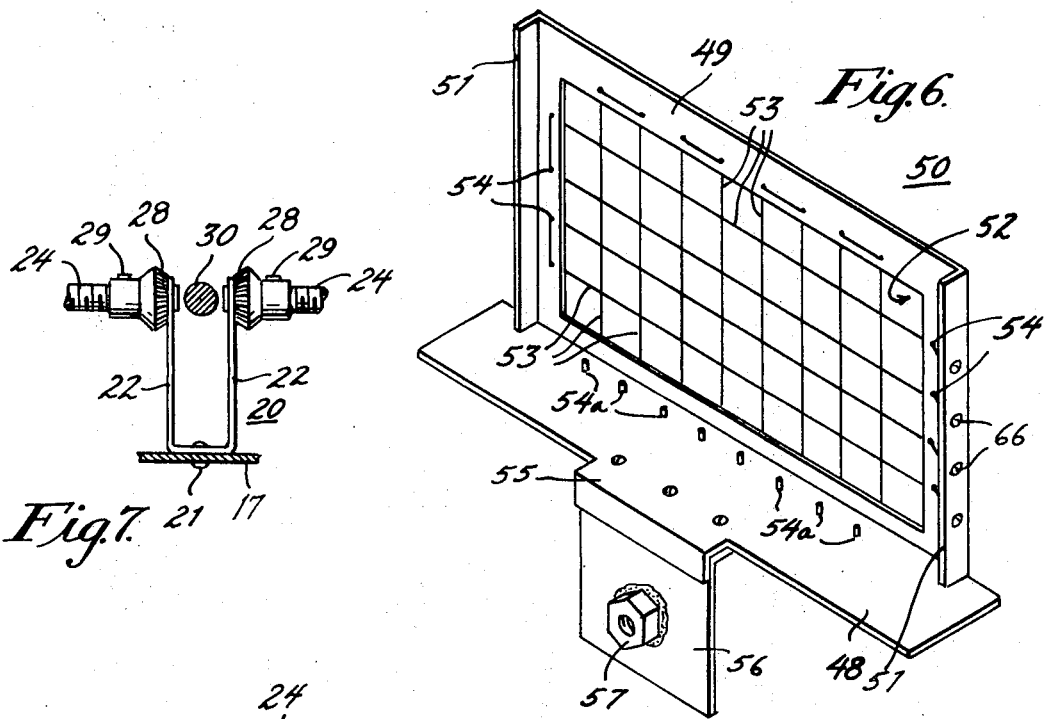
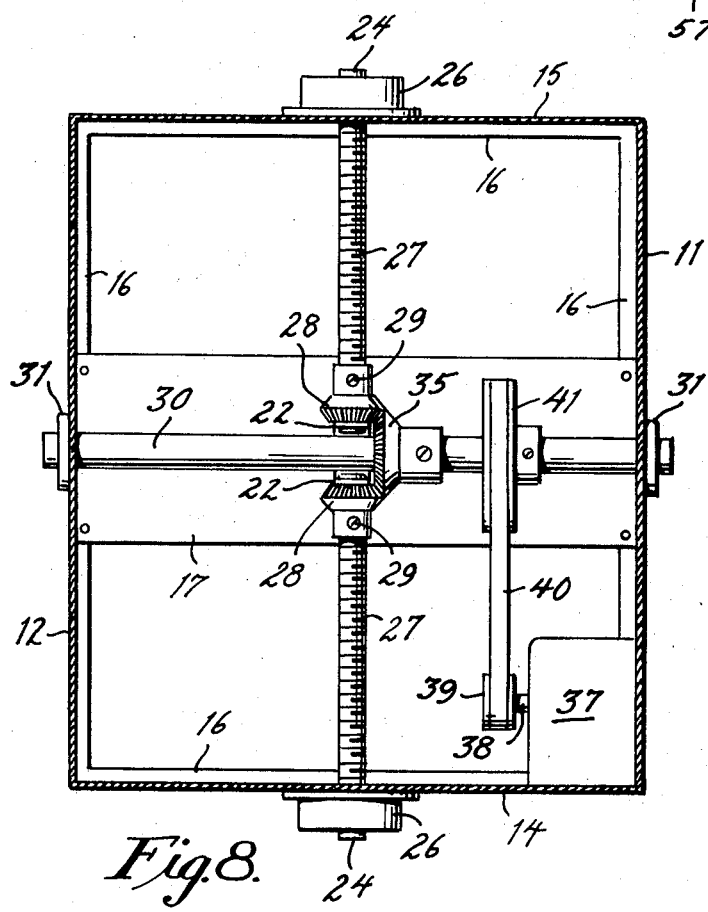
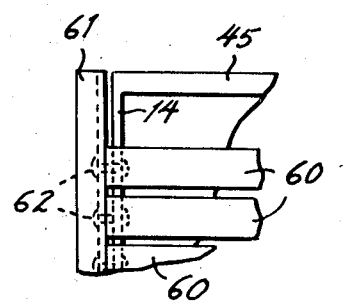

POTATO DICER

BACKGROUND OF THE INVENTION

1. Field of the Invention

A machine for dicing cooked potatoes which has a tracked base with two cutter-carrying frames thereon which move horizontally to cut into strips potatoes carried on support members and at least one vertically movable cutter blade on a frame for further potato cutting.

2. Description of the Prior Art the Invention

Many machines have been devised for dicing cooked potatoes for use in salads and other food combination. None of these has proven wholly satisfactory. The cooked potatoes are quite soft and are easily mashed by the previously available equipment all of which provided a hard support against which the potatoes were put for dicing. In addition the equipment heretofore available was hard to clean and was costly. The potato dicer of the present invention does not mash the cooked potatoes, is easy to operate and clean, is relatively inexpensive to construct and produces diced potatoes of uniform quality.

SUMMARY OF THE INVENTION

A machine for dicing cooked potatoes is provided which carries the potatoes on support members fastened to a base which has tracks carrying a pair of cutting frames which are movable towards and away from each other to cut the potatoes into strips and at least one frame may be provided with a vertically movable blade for cutting the potato strips into cubes.

The principal object of the present invention is to provide apparatus for dicing cooked potatoes which produces diced potatoes of uniform size and quality.

A further object of the present invention is to provide apparatus for dicing cooked potatoes that is simple and inexpensive to construct but sturdy and reliable in operation.

A further object of the present invention is to provide apparatus for dicing cooked potatoes that is easy to operate and to clean.

A further object of the present invention is to provide apparatus for dicing cooked potatoes that presents an attractive appearance.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 5 is a fragmentary vertical sectional view, taken approximately on the line 5–5 of FIG. 4;

FIG. 6 is a perspective view of a cutting frame used with the apparatus of the present invention;

FIG. 7 is a fragmentary view of a mounting bracket used with the apparatus of the present invention; and FIG. 8 is a sectional view similar to FIG. 3 but showing an alternate driving mechanism for the apparatus of the present invention.

Figure 4:
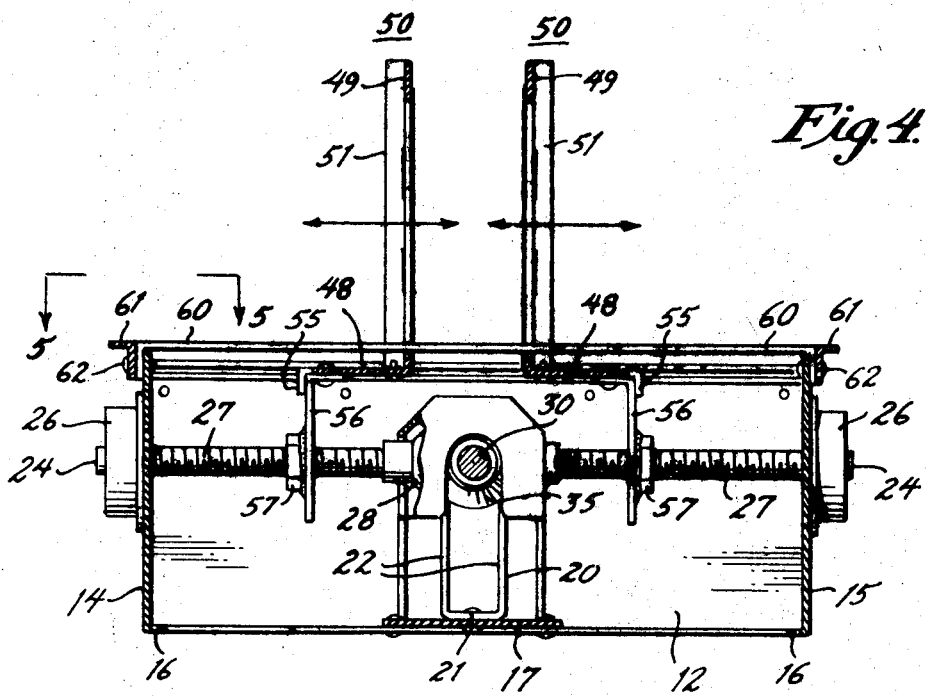
FIG. 4 is a vertical sectional view, taken approximately on the line 4–4 of FIG. 3.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to the drawings and to FIGS. 1 to 7 thereof, the potato dicer of the present invention includes a base assembly 10 which has vertical front and rear panels 11 and 12 and vertical side panels 14 and 15. The panels 11, 12, 14 and 15 are joined together at their ends in a rectangular configuration which is open at the top and bottom.

Each of the panels 11, 12, 14 and 15 has an inturned flange portion 16 on the bottom edge thereof which flange for the panels 11 and 12 has a central plate 17 attached and connecting them together. The plate 17 as shown most clearly in FIG. 7, has a bracket 20 fastened thereto by rivets 21. The bracket 20 is preferably of U-shape in cross section with upturned plates 22. Each of the plates 22 has a shaft 24 rotatably engaged therein and extending respectively to panels 14 and 15 where the shafts 24 are journaled in bearings 26 mounted on the panels 14 and 15. The shafts 24 each has a threaded portion 27 for part of its length and is provided with bevel gears 28 outside of the plates 22, and mounted thereon by screws 29.

A driving shaft 30 is provided which extends from the front panel 11 to the rear panel 12 between the plates 22, is journaled in bearings 31 fastened to the panels 11 and 12, and has a bevel gear 35 thereon engaged with the gears 28. The shaft 30 may have a crank 36 thereon for manual rotational movement of the shaft 30, or, if desired, an electric motor 37 of well known type may be used as shown in FIG. 8. The electric motor 37 is mounted to front panel 11 and side panel 15 and has an output shaft 38, with a V-pulley 39 attached thereto with belt 40 connecting it to a V-pulley 41 fastened to the shaft 30.

The front and rear panels 11 and 12 each has an inturned flange 45 along the top thereof with right-angle members 46 over the flanges 45 and held to the panels 11 and 12 by rivets 47.

Between the flanges 45 and members 46, the baseplate 48 of a pair of opposed cutting frames 50 is slidably supported for horizontal movement. The baseplate 48 has a vertical upright panel 49 fastened thereto which panel has inturned edges 51 and a central cutout portion 52.

A series of filamentary cutting members 53 are strung across cutout 52 in holes 54 which filamentary members are illustrated as being of fine stainless steel wires, however any suitable lightweight material of adequate strength may be used as desired.

The members 53 are additionally strung through holes 54a in the plate 48 providing both vertical and horizontal cutting members. Each of the plates 48 has a rear projecting tongue 55 thereon with a vertical plate 56 secured thereto and having a threaded nut 57 fastened thereto which nut is engaged by the threaded portion 27 of shaft 24 for horizontal opposed movement of the frames 50.

A pair of cutting boards 58 are provided of U-shape in cross section, with one for each frame 50 and having cutouts 59 for engagement with the edges 51 of panel 49. The boards 58 rest on a series of flat supports 60 which pass between the cutting members 53 and provide support for the potatoes (not shown) to be diced.

The boards 58 are secured against excessive movement with respect to the base assembly 10 by rails 61. The rails 61 are secured to the panels 14 and 15 by rivets 62 and which also secure the supports 60 to the panels 14 and 15.

Figure 1:
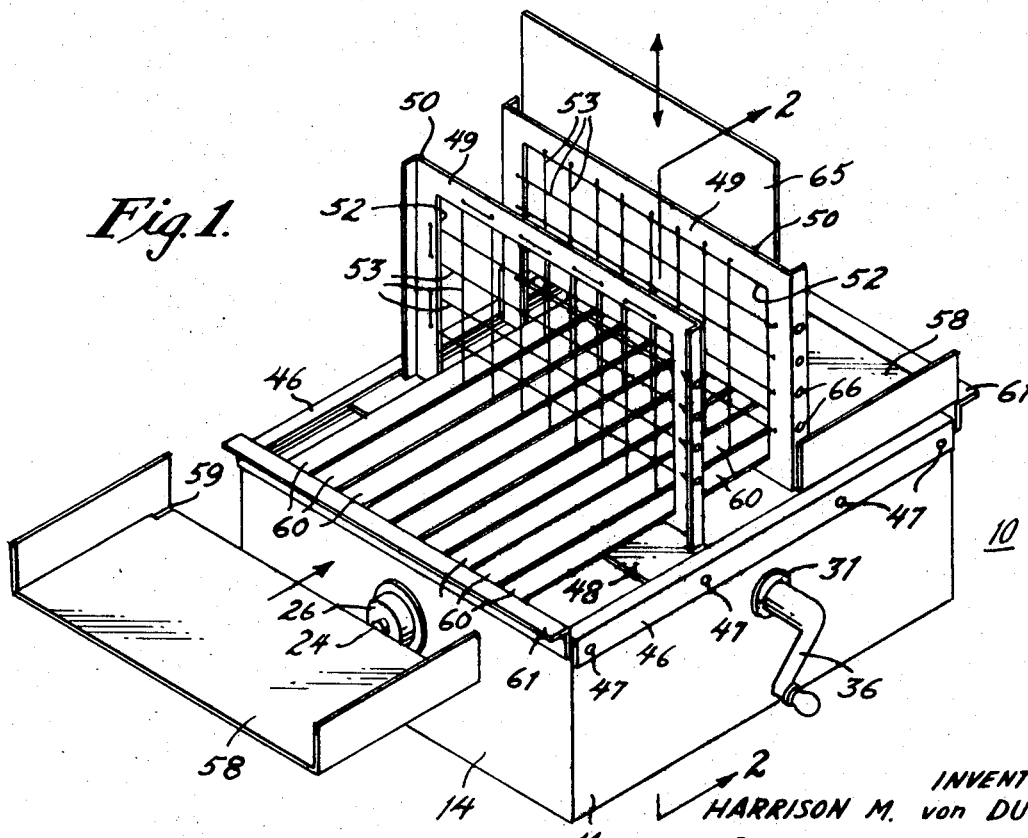
FIG. 1 is a perspective view of the potato-dicing apparatus of the present invention.
Figure 3:
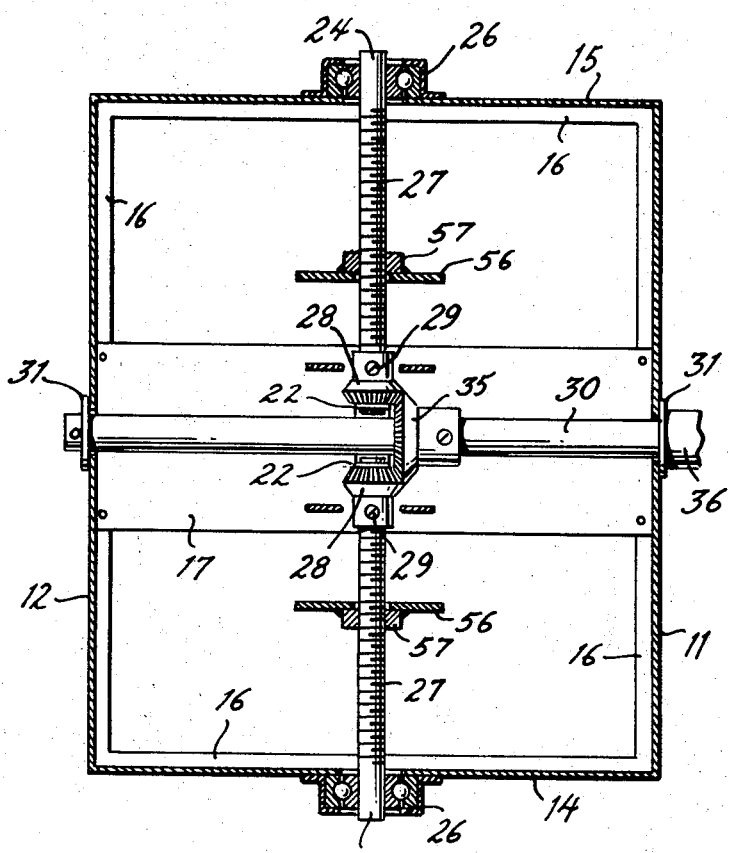
FIG. 3 is a horizontal sectional view, taken approximately on the line 3–3 of FIG. 2.
Figure 2:
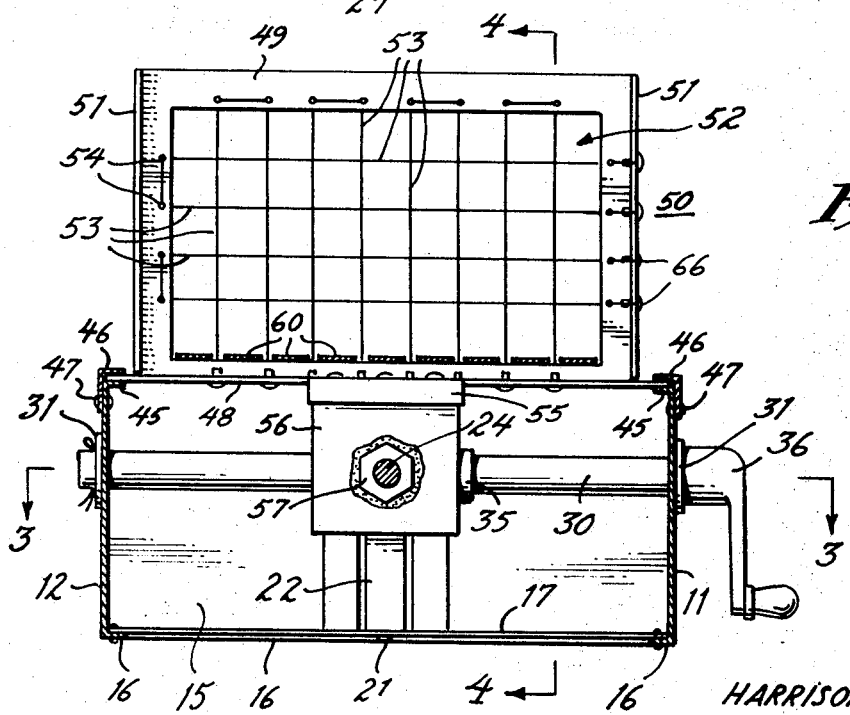
FIG. 2 is a vertical sectional view, enlarged, taken approximately on the line 2–2 of FIG. 1.

As illustrated in FIG. 1 a cutting knife 65 is provided adjacent the frame 50 which knife is movable vertically and retained from movement separate from the frame 50 by a series of rivets 66 which are spaced from the cutting members 53 and extend through the edges 51.

The mode of operation will now be pointed out.

A potato (not shown) which has been cooked to the proper consistency is placed on the supports 60 between the frames 50 and and crank 36 turned or the motor 37 activated to turn shaft 30. The rotational movement of shaft 30 turns bevel gear 35 and gears 28 so that the shafts 24 are caused to rotate and by their engagement with nuts 57 cause the frames 50 to move together, cutting members 53 to engage the potato (not shown) and cause it to be divided into long strips. The knife 65 may be moved vertically and the strips of potato cubed as they emerge from between the cutting members 53. The shaft 30, can then be reversed to move frames 50 apart, a new potato placed therebetween and the operation repeated as desired. The cutting of a cooked potato by filamentary cutters in approaching relation is effectively accomplished with a minimum of crushing or mashing of the potato.

I claim:

1. Apparatus for dicing cooked potatoes which comprises:
    a pair of parallel frames, and
    means for mounting said frames for relative movement in parallel relation toward and away from each other,
    each of said frames having a plurality of filamentary cutting members in intersecting relation for cutting a potato disposed between said frames upon movement of said frames.
2. Apparatus for dicing cooked potatoes as defined in claim 1 in which:
    a horizontal supporting base is provided for the potato to be sliced, and
    said frames are mounted for horizontal movement with respect to said base.
3. Apparatus for dicing potatoes as defined in claim 2 in which potato receiving members are provided movable with said frames.
4. Apparatus for dicing potatoes as defined in claim 2 in which driving means is provided below said frames.
5. Apparatus for dicing potatoes as defined in claim 4 in which
    said driving means includes threaded members carried by each of said frames,
    a rotatable member is provided in engagement with said threaded members, and
    driving means is provided for said rotatable member.
6. Apparatus for dicing potatoes as defined in claim 2 in which said supporting base has a plurality of slots for movement therealong of a plurality of said filamentary cutting members.
7. Apparatus for dicing potatoes as defined in claim 5 in which said driving means also includes a motor.
8. Apparatus for dicing potatoes as defined in claim 2 in which vertically movable cutting means is provided.